(12) United States Patent
Hajati et al.

(10) Patent No.: US 10,277,154 B2
(45) Date of Patent: Apr. 30, 2019

(54) CLOSED-LOOP CONTROL OF LINEAR RESONANT ACTUATOR USING BACK EMF DATA AND HALL SENSING

(71) Applicant: Apple Inc., Cupertino, CA (US)

(72) Inventors: Arman Hajati, Santa Clara, CA (US); Hari Vasudevan, Los Gatos, CA (US)

(73) Assignee: Apple Inc., Cupertino, CA (US)

( * ) Notice: Subject to any disclaimer, the term of this patent is extended or adjusted under 35 U.S.C. 154(b) by 29 days.

(21) Appl. No.: 15/698,559

(22) Filed: Sep. 7, 2017

(65) Prior Publication Data

US 2018/0316296 A1    Nov. 1, 2018

Related U.S. Application Data

(60) Provisional application No. 62/492,863, filed on May 1, 2017.

(51) Int. Cl.
*H02P 25/032*    (2016.01)
*H02P 29/68*    (2016.01)
(Continued)

(52) U.S. Cl.
CPC ............ *H02P 25/032* (2016.02); *H02K 11/25* (2016.01); *H02K 33/16* (2013.01); *H02P 29/685* (2016.11); *H02K 11/215* (2016.01)

(58) Field of Classification Search
CPC ... H02P 25/032; H02P 29/685; H02K 11/215; H02K 11/25
(Continued)

(56) References Cited

U.S. PATENT DOCUMENTS 7,268,503 B2    9/2007  Yamasaki et al.
9,524,624 B2   12/2016  Rank et al.
(Continued)

FOREIGN PATENT DOCUMENTS

WO    WO 98/14033    4/1998

OTHER PUBLICATIONS

Robert Nicoletti, "Audio amplifier basics: Select the best topology for your design," EE Times—Connecting the global Electronics Community, Apr. 24, 2013, 6 pages.
(Continued)

*Primary Examiner* — Kawing Chan
(74) *Attorney, Agent, or Firm* — Fish & Richardson P.C.

(57) ABSTRACT

In an embodiment of a system for closed-loop control of a linear resonant actuator, a system processor coupled to a magnetic field sensor is configured to: receive a magnetic field sensor signal from a channel coupling a magnetic field sensor and the system processor; receive measurements of actuator current and actuator voltage from drive electronics; receive a temperature signal from a linear resonant actuator, the temperature signal indicating a temperature of the magnetic field sensor; calculate a first estimate of mass position using the magnetic field sensor signal, actuator current and a magnetic model; calculate an estimate of coil resistance based on the temperature signal, the actuator current, the actuator voltage and a thermal model; and calculate a second estimate of mass position and an estimate of mass velocity based on the first estimate of mass position, the actuator current, the actuator voltage and the estimated coil resistance.

20 Claims, 4 Drawing Sheets

(51) Int. Cl.
  *H02K 11/25* (2016.01)
  *H02K 33/16* (2006.01)
  *H02K 11/215* (2016.01)

(58) Field of Classification Search
  USPC .......................................................... 318/128
  See application file for complete search history.

(56) References Cited

U.S. PATENT DOCUMENTS

| | | |
|---|---|---|
| 9,746,923 B2 | 8/2017 | Cruz-Hernandez et al. |
| 9,764,357 B2 | 9/2017 | Houston |
| 9,802,225 B2 | 10/2017 | Houston |
| 2010/0153845 A1* | 6/2010 | Gregorio ................. G06F 3/016 715/702 |
| 2012/0229264 A1 | 9/2012 | Company Bosch et al. |
| 2017/0053502 A1 | 2/2017 | Shah |
| 2017/0090574 A1 | 3/2017 | Baer et al. |
| 2017/0093318 A1 | 3/2017 | Ge et al. |
| 2017/0169674 A1 | 6/2017 | Macours |
| 2017/0182517 A9 | 6/2017 | Houston |

OTHER PUBLICATIONS

Honda et al., "Application Note AN-1071," Class D Audio Amplifier Basics, International IOR Rectifier, 2005, 14 pages.

"High-Efficiency, Low-Noise Audio Subsystem," Maxim Innovation Delivered, 2011, 48 pages.

Analog Devices, "Microphone Preamplifier with Variable Compression and Noise Gating," Data Sheet SSM2166, 1996-2016, 14 pages.

* cited by examiner

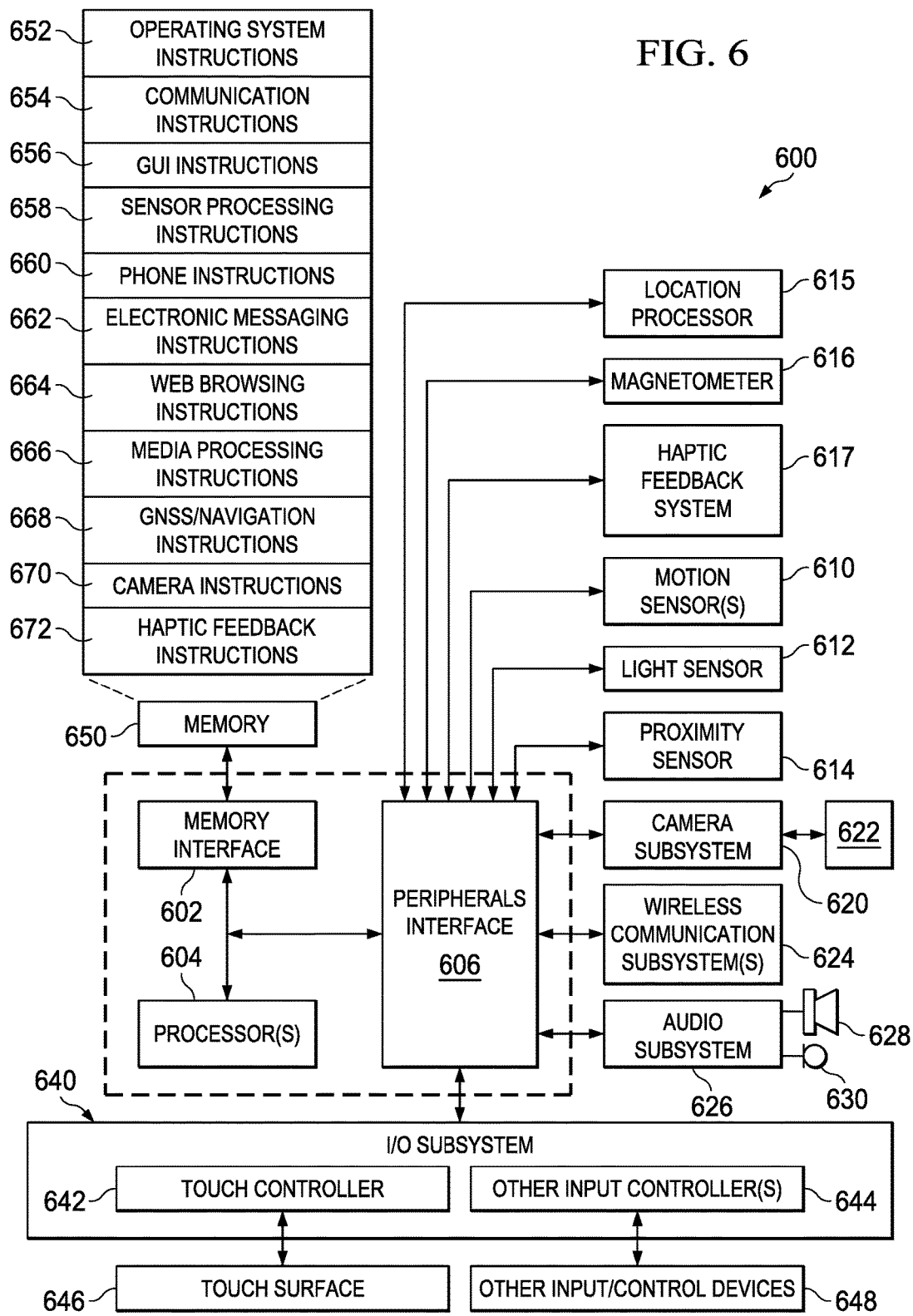

CLOSED-LOOP CONTROL OF LINEAR RESONANT ACTUATOR USING BACK EMF DATA AND HALL SENSING

CROSS-REFERENCE TO RELATED APPLICATION

This application claims priority to U.S. Provisional Application No. 62/492,863, filed May 1, 2017, the entire contents of which are incorporated herein by reference.

TECHNICAL FIELD

This disclosure relates generally to controlling linear resonant actuators, such as haptic engines.

BACKGROUND

Some mobile devices (e.g., smart phones) include a haptic engine that is configured to provide a tactile sensation such as a vibration to a user touching or holding the mobile device. The haptic engine is a linear resonant actuator (LRA) that is mechanically connected to an input surface of the mobile device. Drive electronics coupled to the LRA cause the LRA to induce vibration which is transferred to the input surface so that the vibration can be felt by a user who is touching or holding the mobile device.

SUMMARY

A system for providing closed-loop control of a linear resonant actuator is disclosed. In an embodiment, the system comprises: a linear resonant actuator including a frame, one or more coils mounted to the frame and operable to generate a magnetic field; a mass including magnetic portions positioned within the frame and configured to move within the frame along a movement axis; and a magnetic field sensor mounted to the frame. The magnetic field sensor is configured to generate a magnetic field sensor signal in response to the magnetic field. Drive electronics are coupled to the linear resonant actuator and configured to drive current into the one or more coils in response to an actuator control signal. A system processor is coupled to the magnetic field sensor and the drive electronics, the system processor configured to: receive the magnetic field sensor signal from a channel coupling the magnetic field sensor and the system processor; receive measurements of actuator current and actuator voltage from the drive electronics; receive a temperature signal from the linear resonant actuator, the temperature signal indicating a temperature of the magnetic field sensor; calculate a first estimate of mass position using the magnetic field sensor signal, actuator current and a magnetic model; calculate an estimate of coil resistance based on the temperature signal, the actuator current, the actuator voltage and a thermal model; and calculate a second estimate of mass position and an estimate of mass velocity based on the first estimate of mass position, the actuator current, the actuator voltage and the estimated coil resistance; calculate the actuator control signal based on the second estimate of mass position and the estimate of mass velocity, and one or more set points; and provide the actuator control signal to the drive electronics, the actuator control signal configured to cause the drive electronics to adjust the drive current into the one or more coils.

Particular embodiments disclosed herein provide one or more of the following advantages. The disclosed embodiments estimate position and velocity of a moving mass using back electromotive force (EMF) data and one or more magnetic field sensors (e.g., Hall sensors). The one or more magnetic field sensors provide low frequency estimation of relative drift and inertial disturbances. The temperature of a magnetic field sensor is used with a thermal model in the digital domain to provide a reliable mass velocity estimate using the back EMF data. An observer (e.g., a Kalman filter) implemented in the digital domain is used to combine the back EMF data (high-pass filtered) and magnetic field sensor data (low-pass filtered) to reliably estimate the position and velocity of the moving mass.

In an embodiment, the analog output signals of a magnetic field sensor are coupled directly to a system processor in the digital domain (e.g., microprocessor, digital signal processor) using one or more analog channels (e.g., circuit traces or wires). This direct coupling of the analog output signals to the system processor in the digital domain simplifies the design of the LRA module by reducing the number parts, including removing the analog front end (AFE) electronics, memory and EMI shield cans. The reduction in parts also simplifies the hot bar design (e.g., by reducing the number of pads) and allows use of a single active flex circuit. The reduction of parts and associated reduction of complexity significantly lowers the unit cost for the LRA module, and potentially any system in which the LRA module is integrated (e.g., a smartphone).

In an embodiment, a digital signal processor (DSP) chip that is used for other purposes in a system (e.g., an audio processor) can be used to process the analog output signals from the magnetic field sensor and compute position and velocity estimates of the moving mass. For example, an ADC in an audio DSP chip can be used to convert the analog output signals to digital signals which are combined with back EMF data by a discrete time, state space observer to produce the reliable position and velocity estimates.

The details of the disclosed implementations are set forth in the accompanying drawings and the description below. Other features, objects and advantages are apparent from the description, drawings and claims.

DESCRIPTION OF DRAWINGS

FIG. 6 is a diagram of an example mobile device architecture that uses a haptic engine as described in reference to FIGS. 1-5, according to an embodiment.

The same reference symbol used in various drawings indicates like elements.

DETAILED DESCRIPTION

A LRA (e.g., a haptic engine) includes a mass positioned in a housing that is driven to move or oscillate to induce a vibratory response. A magnetic field sensor is included in the housing that varies its output voltage in response to changes in a magnetic field as the mass moves along a movement axis within the housing. The output voltage is used by a closed-loop control application to estimate position and velocity of the mass on the movement axis. The closed-loop control application estimates the position and velocity of the mass to avoid a crash, to minimize variations over a population of haptic engines, and provides a crisper haptic feedback by reducing unwanted oscillation by minimizing the LRA's ring down.

The mass position is estimated by integrating a back electromotive force (EMF) voltage (which provides an approximation of the mass velocity) and using one or more magnetic field sensors (e.g., one or more Hall sensors) to estimate low frequency motion/drift of the mass. Using sensor fusion, high-pass filtered back EMF data is combined with low-pass filtered analog output of a magnetic sensor using a discrete time, state space observer (e.g., a Kalman filter implemented in software) to obtain a reliable and high-quality estimate of the moving mass position and velocity. The high-quality estimation of mass position and velocity can be used by a closed-loop control application to generate actuator control signals for controlling a power amplifier (e.g., controlling the duty-cycle) used to drive current in the coils and thus control the motion of the mass on a movement axis.

Additionally, the temperature of the analog magnetic field sensor is used with a thermal model to estimate coil resistance. The estimated coil resistance can be combined by the observer in the digital domain with the high-pass filtered Back EMF data and the low-pass filtered magnetic field sensor output to provide a reliable and high-quality estimate of the mass position and velocity. The discrete time, state space observer and back EMF and thermal models can be implemented in the digital domain using any system processor, including a processor that is already performing other system tasks (e.g., an audio DSP or system-on-chip (SOC)). By directly coupling the output of the magnetic field sensor to the system processor using analog channels (e.g., circuit traces, wires), the number of hardware components in the LRA can be reduced to save cost.

Example System

Figure 1A:
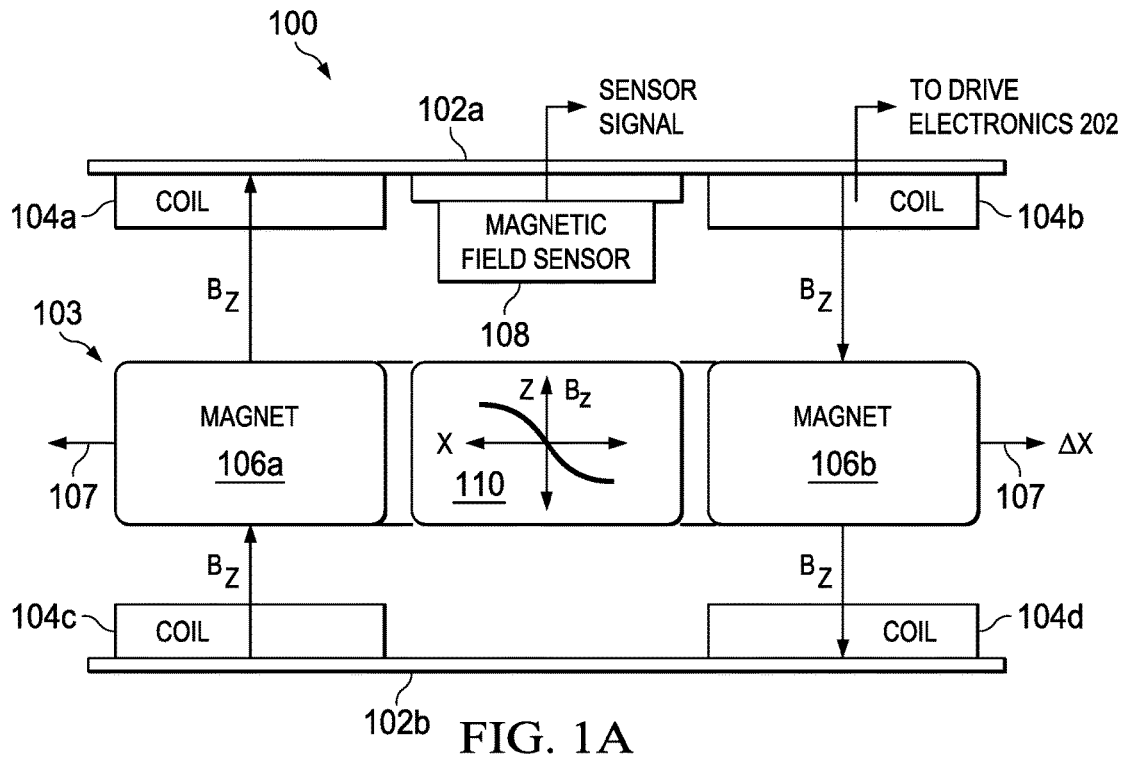
FIG. 1A is a cross-sectional view of an example double-sided, moving magnet LRA, according to an embodiment.

FIG. 1A is a cross-sectional view of an example double-sided, moving magnet LRA 100, according to an embodiment. LRA 100 includes coils 104a-104d mounted to opposing housing portions 102a, 102b. Mass 103 is positioned within a housing that includes portions 102a, 102b. Mass 103 can be mechanically constrained (e.g., constrained by a shaft and/or other mechanical guides or by a stiff suspension using flexures) to move linearly along movement axis 107 (x-axis) in two directions. Mass 103 includes magnets 106a, 106b. Magnetic field sensor 108 (e.g., a Hall sensor) is mounted on a flexible printed circuit (FPC) which is attached to portion 102a. Although magnetic field sensor 108 is shown mounted to portion 102a (e.g., the top of the housing), in another embodiment magnetic field sensor 108 could be mounted to portion 102b (e.g., the bottom of the housing). In another embodiment, there can be two or more opposing magnetic sensors 108 mounted to portions 102a, 102b for controlling z-axis motion of the mass within the housing.

When LRA 100 is in operation, an alternating current that is provided through coils 104a-104d causes a Lorentz force that drives mass 103 along movement axis 107 in two directions about a magnetic reference (e.g., magnetic zero reference), which is illustrated by graph 110 for discussion purposes. A position $\Delta x$ of mass 103 on movement axis 107 is a function of the amplitude and frequency of the current flowing through coils 104a-104d. In the example configuration shown, coils 104a-104d and magnets 106a, 106b are used to drive mass 103 along movement axis 107 and to sense the position of mass 103 on movement axis 107.

The position of mass 103 on movement axis 107 can be estimated by integrating a back EMF voltage ($V_{bEMF}$) that is generated by coils 104a-104d. The back EMF voltage pushes against the current flowing in coils 104a-104d, which induces the back EMF voltage. The back EMF voltage, $V_{bemf}$, is not directly observable but can be reconstructed. For a LRA, $V_{bemf}$ is given by Equation [1]:

$$V_{bemf}(t) = V_{act}(t) - (R_{act}(t) * i_{act}(t) + L_{act}(t) * i'_{act}(t)), \quad [1]$$

where $V_{act}(t)$ is the actuator voltage, $R_{act}(t)$ is the actuator resistance, $L_{act}(t)$ is the actuator inductance, $i_{act}(t)$ is the actuator current, and $i'_{act}(t)$ is the time derivative of the actuator current. The actuator resistance $R_{act}(t)$ and inductance $L_{act}(t)$ can be estimated in real-time by applying a small (e.g., 80 mV) background voltage signal at either very high (e.g. 2 kHz) or very low frequencies (e.g. 20 Hz) where the actuator is known to have virtually no position response (e.g., <10 um). The velocity of the actuator is proportional to $V_{bemf}(t)$. Using back EMF voltage to estimate position of mass 103 is prone to errors due to the resistance $R_{act}(t)$ estimation and the inability of the control application to sense a low-velocity drift that is caused by inertial disturbances.

In an embodiment, magnetic field sensor 108 generates an analog sensor signal (e.g., a voltage signal) that varies in response to a magnetic field in LRA 100 and an analog sensor signal which varies in response to a temperature change of magnetic field sensor 108. Additionally, coils 104a-104d are coupled to drive electronics 202, as described in reference to FIG. 2.

Figure 1B:
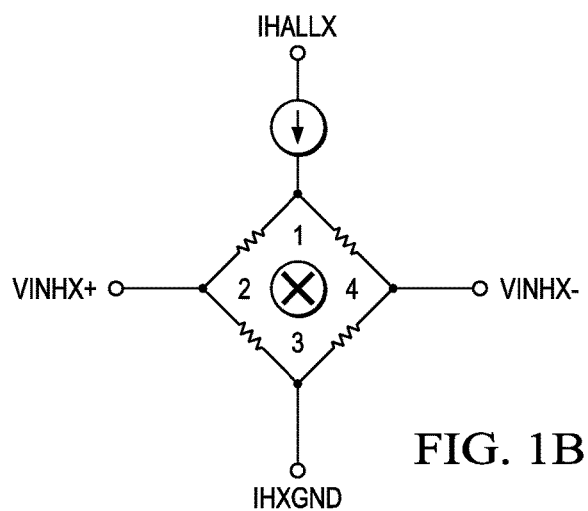
FIG. 1B is a schematic diagram of an example magnetic field sensor, according to an embodiment.

FIG. 1B is a schematic diagram of an example magnetic field sensor 108. In the example shown, magnetic field sensor 108 is a Hall sensor. The Hall sensor behaves like a Wheatstone bridge. When driven by a current source ($I_{HALLX}$), a differential output Hall voltage $V_{INHX}$ ($V_B$) is proportional to the magnetic field ($B_Z$) and the current source $I_{HALLX}$. The voltage at the $I_{HALLX}$ node ($V_R$) is proportional to the Hall sensor resistance which is a proxy for its temperature.

Figure 2:
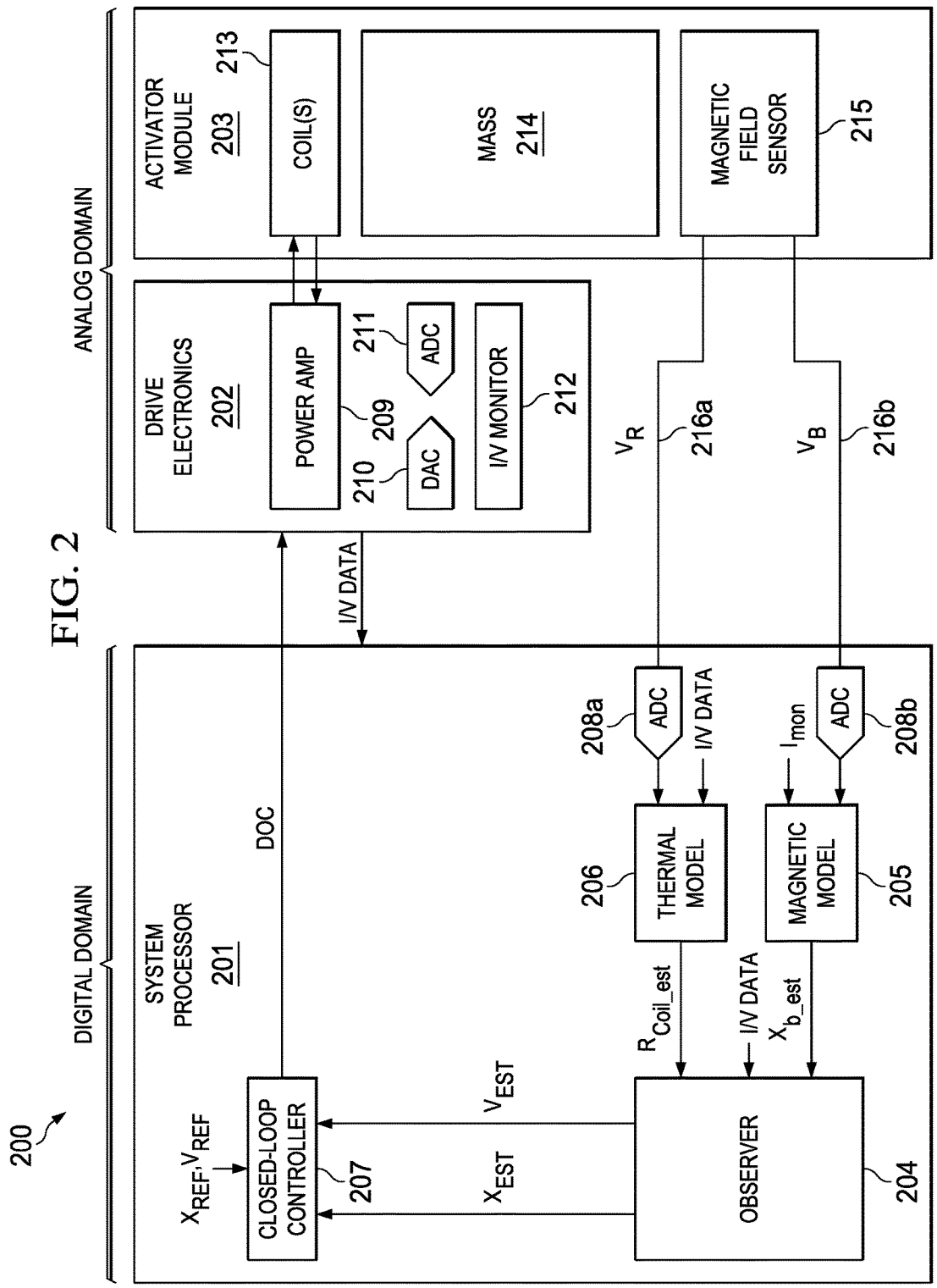
FIG. 2 is a block diagram of a closed-loop LRA control system, according to an embodiment.

FIG. 2 is a block diagram of a closed-loop LRA control system 200, according to an embodiment. System 200 includes system processor 201, LRA drive electronics 202 and LRA module 203. System processor 201 further includes observer 204, magnetic model 205, thermal model 206, closed-loop controller 207 and ADCs 208a, 208b. Drive electronics 202 further includes power amplifier 209, DAC 210, ADC 211 and I/V monitor 212. LRA module 203 further includes coils 213, mass 214 and magnetic field sensor 215.

System 200 is an example embodiment and other embodiments can include more or fewer components. For example, system 200 can include additional magnetic field sensors. A practical implementation of system 200 can include other components that have been removed from FIG. 2 for clarity, including but not limited to: thermal protection circuitry, power supply circuitry, circuitry for generating controller set points, memory, communication buses (e.g., SPI, I2C serial buses), filters, logic, clock generators, hot bars, flex circuits, etc. In an embodiment, system processor 201 and drive electronics 202 can be separate IC chips or embedded together in a single system-in-package (SiP). The SiP can be embedded in another system or device, such as, for example, a smartphone, tablet computer, wearable computer (e.g., a smartwatch) or any other electronic device that uses an LRA module for haptic feedback.

System processor 201 can be any processor that can execute software instructions to perform operations, including but not limited to: a microprocessor (single core or multi-core), DSP chip, microcontroller, FPGA, ASIC and hardware controller. In an embodiment, system processor 201 can perform other system tasks including, for example, audio processing tasks. System processor 201 receives analog signals directly from magnetic field sensor 215 over analog channels 216a, 216b. Analog channels 216a, 216b can be circuit traces or wires. In an embodiment, system processor 201 also receives I/V data from drive electronics 202. The I/V data is obtained by I/V monitoring 212. The I/V data is the actuator current $I_{act}(t)$ and actuator voltage $V_{act}(t)$, which has been converted to digital signals by ADC 211 in drive electronics 202.

The analog signals $V_R$, $V_B$ output by magnetic sensor 215 are converted to digital signals using ADCs 208a, 208b. For example, $V_R$ is converted to a first digital signal by ADC 208a. $V_R$ is an analog voltage signal that varies in response to a change in thermal resistance due to a change in temperature of magnetic field sensor 215. The first digital signal is input into thermal model 206 together with the I/V data. The I/V data can be transferred to system processor 201 using any suitable interface module (e.g., I2C, I2S, SPI or SoundWire serial interface).

Thermal model 206 is implemented in software and provides an estimate of the resistance of coil 213 resistance ($R_{coil\_est}$) in LRA module 203. The resistance $R_{coil\_est}$ is used to determine mass velocity and is represented as $R_{act}(t)$ in Equation [1] in the analog domain. The resistance $R_{coil\_est}$ is input into observer 204 together with the I/V data and a first estimate $X_{b\_est}$ of mass position output by magnetic model 205. Magnetic model 205 calculates $X_{b\_est}$ based the I/V data and $V_B$ (e.g., the Hall voltage), which is converted to a digital signal by ADC 216b before being used by back EMF model 205.

In an embodiment, magnetic model 205 provides a coarse estimate of mass position $X_{b\_est}$ based on the coil current Lion and the Hall voltage $V_B$, where $V_B$ is calculated using Equation [2]:

$$V_B = f(x) + C*I_{mon}, \quad [2]$$

where f(x) and c are factors that are estimated or calibrated. Moving mass 214 (a moving magnet) generates a magnetic field ($B_Z$) which is a nonlinear function of its position X in magnetic field sensor 215. In addition, coils 213 induce a magnetic field proportional to the current into magnetic field sensor 215. Therefore, the voltage $V_B$ sensed by magnetic field sensor 215 is a nonlinear function f(x) of the position X, plus a scaled version of the coil current, $c*I_{mon}$. Magnetic model 205 uses these factors to estimate the position $X_{b\_est}$ based on $V_B$ and $I_{mon}$, given by Equation [3]:

$$X_{b\_est} = f^{-1}(V_B - c*I_{mon}), \quad [3]$$

where $f^{-1}$ is an inverse of the nonlinear function f(x) that is measured and calibrated experimentally for each LRA module and stored in a look-up table in controller 207.

Observer 204 receives as input $R_{coil\_est}$, UV data and $X_{b\_est}$ and outputs a more reliable, higher quality mass position $X_{est}$ and mass velocity $V_{est}$. In an embodiment, observer 204 is a Kalman filter, which takes as measurements or observations the course estimate of mass position $X_{b\_est}$ and the actuator current I from the I/V data. An example formulation of a Kalman filter for a LRA is disclosed in APPENDIX A.

Closed-loop controller 207 receives as inputs the filtered estimates of mass position and mass velocity ($X_{est}$, $V_{est}$) and a setpoint or reference mass position and velocity ($X_{Ref}$, $V_{Ref}$), and outputs an actuator control signal. Controller 207 can implement any desired control law. In an embodiment, controller 207 includes a feedforward component for rapid response and feedback component to compensate for errors in the plant model. An example suitable controller 207 is a proportional-integral-derivative (PID) controller that continuously calculates an error value as the difference between the desired set point ($X_{Ref}$, $V_{Ref}$) and the measured process variables ($X_{est}$, $V_{est}$). Other controllers can also be used that have more or less complexity, including P controllers, PI controllers, or PD controllers. In another embodiment, a state-space observer is used as a state feedback path in addition to a feedforward path. The feedback control command is $u = KX = k_1*x_1 + k_2*x_2$, where $x_1$ and $x_2$ are the estimated position and velocity states, respectively. In another embodiment, the feedback u is a non-linear function of the states, $u = g(x, t)$, such as a sliding-mode control.

The actuator control signal can be a digital command output in pulse code modulation (PCM), pulse width modulation (PWM), pulse density modulation (PDM), etc. The PWM is coupled to drive electronics 202 and is used to control the duty-cycle of power amplifier 209 (e.g., a power converter). By changing the PWM signal, power amplifier 209 can control how much current is injected into coils 213 and therefore control the movement of mass 214 along a movement axis. The more accurate the measured process variables ($X_{est}$, $V_{est}$) the more accurate the PWM signal, and the more accurate the PWM signal, the more accurate the control of mass 214.

Figure 3:
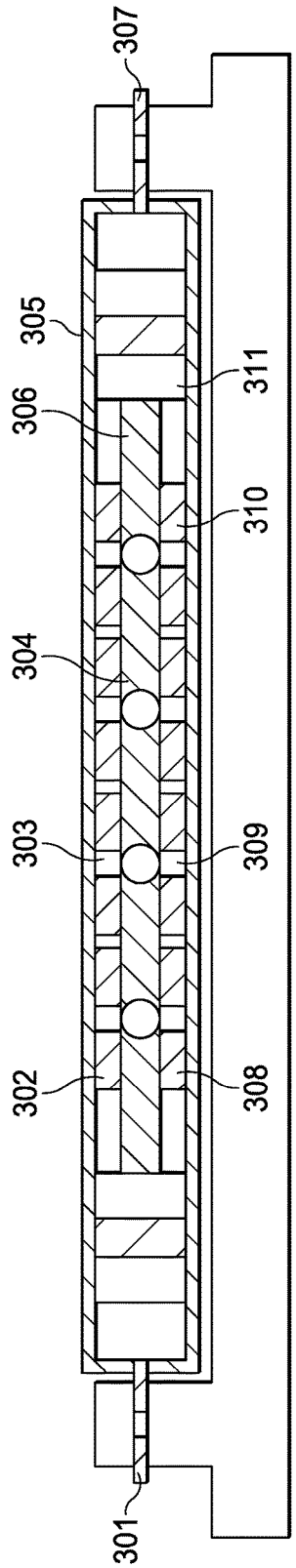
FIG. 3 is perspective view of an example double-sided, moving magnet LRA with a single bottom magnetic field sensor, according to an embodiment.

An advantage of system 200 is that the AFE electronics that are typically located in conventional LRA modules is removed from LRA module 203 and the analog output signals from magnetic field sensor 215 are coupled directly to system processor 201. Although the analog output signals may be noisy due to the distance the signals have to travel on analog channels 216a, 216b, the high-frequency noise is mitigated by observer 204 in the digital domain, which behaves like a low-pass filter or smoother on the magnetic field sensor signals. Accordingly, the closed-loop control system 200 allows for a reduction in unit cost of LRA module 203 due to the reduction of parts, and still meets the strict specifications for control of mass position and velocity typically required for many LRA applications, such as Haptic engine applications FIG. 3 is perspective view of an example double-sided, moving magnet LRA module 300 with a single bottom magnetic field sensor to illustrate temperature-based resistance estimation, according to an embodiment. LRA module 300 includes mounting tab 301, top coils 302, top hall sensor 303, magnets 304, cover 305, housing 306, mounting tab 307, bottom coil 308, bottom hall sensor 309, base 310 and mass 311 (e.g., tungsten mass). The function of passive components 302, 303, 304, 308, 309, 311 have been previously described with respect to FIGS. 1A and 2 and will not be described again here. LRA module 300 be used to generate the variables for thermal model 206, shown in FIG. 2.

Figure 4:
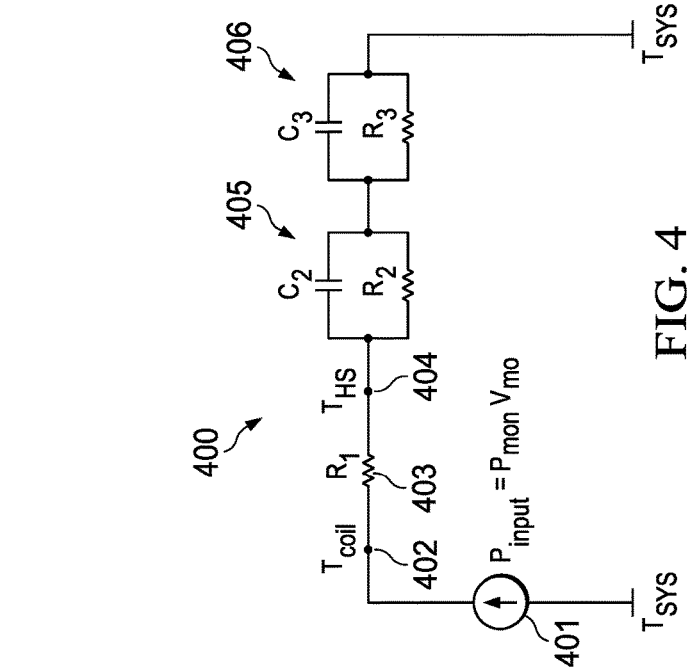
FIG. 4 is a circuit schematic illustrating a thermal model for estimating coil resistance, according an embodiment.

FIG. 4 is a model circuit representing thermal model 206 for estimating coil resistance $R_{coil\_est}$, according an embodiment. Thermal model circuit 400 includes input power 401 ($P_{input} = I_{mon}*V_{mon}$) which can be obtained from IN data, temperature of the coil 402 ($T_{coil}$), thermal resistance 403 ($R_1$), temperature of the hall sensor 404 ($T_{HS}$), RC circuit 405 ($R_2$, $C_2$) and RC circuit 406 ($R_3$, $C_3$). $R_1$, $R_2$ are distributed thermal resistances across LRA module 300, and $C_2$, $C_3$ are distributed thermal masses across LRA module 300. From a thermal standpoint, LRA module 300 is a complicated distributed thermal system. However, the thermal system can be estimated as a third order lumped parameter model using thermal $R_2$, $R_3$, $C_2$ and $C_3$.

Based on thermal model 400, coil resistance Rcoil_est can be estimated using Equations [2] and [3]:

$$T_{coil} \approx T_{HS} + R_1 I_{mon} V_{mon}, \qquad [2]$$

$$R_{coil\_est} \approx \alpha T_{coil} + \beta, \qquad [3]$$

where $\alpha$ and $\beta$ are estimated by calibrating the LRA module at two steady-state temperatures under hot and cold conditions, and the effective thermal resistance $R_1$ can be estimated by driving the LRA module at system-level at maximum power (for example using a vibration at a first frequency (e.g., 300 Hz)) and measuring the actual coil resistance using a super-imposed high frequency tone (e.g., 750 Hz). Since the Hall sensor and the coils are located next to each other, they have a strong thermal correlation and the temperature (and hence its resistance) of the Hall sensor is a function of the coil temperature (and hence its resistance) and the input electrical power. Therefore, we can assume that the coil resistance, $R_{coil}$, is a linear function of Hall sensor resistance, $R_{Hall}$, plus the input electrical power. To fit an experimental curve, we need to measure the $R_{coil}$ versus $R_{Hall}$ and power during a calibration process.

Example Process

Figure 5:
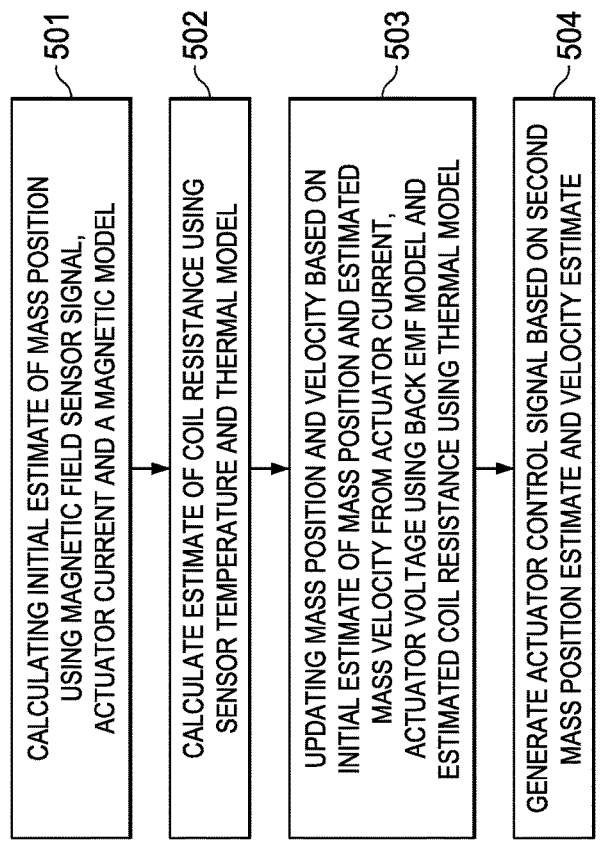
FIG. 5 is a flow diagram of an example process of estimating position and velocity of a moving mass of an LRA, according to an embodiment.

FIG. 5 is a flow diagram of an example process 500 of estimating mass position and velocity of a moving mass of an LRA as described in reference to FIGS. 1-3, according to an embodiment. Process 500 can be implemented by, for example, the mobile architecture 600 described in reference to FIG. 6.

Process 500 can begin by calculating an initial estimate of mass position using a magnetic field sensor signal, actuator current and a magnetic model (501). For example, an analog output signal from a magnetic field sensor is sent to a system processor which converts the analog output signal into a digital signal. Additionally, I/V data is obtained from a drive electronics module. The back EMF model can provide a coarse estimate of mass position using, for example, Equation [1].

Process 500 can continue by calculating an estimate of coil resistance using the temperature of the magnetic field sensor and a thermal model (502). For example, the I/V data and an analog magnetic field sensor signal from the magnetic field sensor is sent to the system processor which converts the analog output signal into a digital signal. The thermal model can provide an estimate of coil resistance using, for example, Equations [2] and [3]. In other embodiments, the magnetic field sensor signal is a digital signal.

Process 500 can continue by updating the mass position and velocity based on the initial estimate of mass position from the magnetic model and the estimated mass velocity from the actuator current, actuator voltage using a back EMF model and estimated coil resistance using a thermal model (503). For example, a discrete time, state space observer can be used to combine the initial estimate of mass position, the estimated coil resistance and UV data to produce more reliable and higher quality mass position and velocity estimates. An example observer is a Kalman filter. An example Kalman filter formulation for LRA is described in APPENDIX A.

Process 500 can continue by generating an actuator control signal based on the second estimated mass position and estimated velocity (504). For example, the second estimated mass position and estimated velocity can be provided as plant measurements or observations to a closed-loop controller implemented in the system processor. The controller can be, for example, a full-state feedback or sliding-mode controller. The controller generates a digital command output (DCO), which is used to control the duty-cycle of a power amplifier in driver electronics. The estimated mass position and velocity enable the controller to generate an appropriate DCO signal. Responsive to the DCO signal, the power amplifier controls the flow of actuator current into the coils of an LRA module to control the motion of the mass of the LRA module, which is sensed by reconstruction of the back EMF produced by the coils and the analog output signal of a magnetic field sensor, thereby creating closed-loop control system for the LRA module.

Example Device Architecture

FIG. 6 is a diagram of an example mobile device architecture that uses one of the haptic engines described in reference to FIGS. 1-5, according to an embodiment.

Architecture 600 may be implemented in any mobile device for generating the features and processes described in reference to FIGS. 1-5, including but not limited to smart phones and wearable computers (e.g., smart watches, fitness bands). Architecture 600 may include memory interface 602, data processor(s), image processor(s) or central processing unit(s) 604, and peripherals interface 606. Memory interface 602, processor(s) 604 or peripherals interface 606 may be separate components or may be integrated in one or more integrated circuits. One or more communication buses or signal lines may couple the various components.

Sensors, devices, and subsystems may be coupled to peripherals interface 606 to facilitate multiple functionalities. For example, motion sensor(s) 610, light sensor 612, and proximity sensor 614 may be coupled to peripherals interface 606 to facilitate orientation, lighting, and proximity functions of the device. For example, in some embodiments, light sensor 612 may be utilized to facilitate adjusting the brightness of touch surface 646. In some embodiments, motion sensor(s) 610 (e.g., an accelerometer, rate gyroscope) may be utilized to detect movement and orientation of the device. Accordingly, display objects or media may be presented according to a detected orientation (e.g., portrait or landscape).

Haptic engine 617, under the control of haptic engine instructions 672, provides the features and performs the processes described in reference to FIGS. 1-5, such as, for example, implementing haptic feedback (e.g., vibration). Haptic engine 617 can include one or more actuators, such as piezoelectric transducers, electromechanical devices, and/or other vibration inducing devices, that are mechanically connected to an input surface (e.g., touch surface 646). Drive electronics coupled to the one or more actuators cause the actuators to induce a vibratory response into the input surface, providing a tactile sensation to a user touching or holding the device.

Other sensors may also be connected to peripherals interface 606, such as a temperature sensor, a barometer, a biometric sensor, or other sensing device, to facilitate related functionalities. For example, a biometric sensor can detect fingerprints and monitor heart rate and other fitness parameters. In some implementations, a Hall sensing element in haptic engine 617 can be used as a temperature sensor.

Location processor 615 (e.g., GNSS receiver chip) may be connected to peripherals interface 606 to provide geo-referencing. Electronic magnetometer 616 (e.g., an integrated circuit chip) may also be connected to peripherals interface 606 to provide data that may be used to determine the direction of magnetic North. Thus, electronic magnetometer 616 may be used to support an electronic compass application.

Camera subsystem 620 and an optical sensor 622, e.g., a charged coupled device (CCD) or a complementary metal-oxide semiconductor (CMOS) optical sensor, may be utilized to facilitate camera functions, such as recording photographs and video clips.

Communication functions may be facilitated through one or more communication subsystems 624. Communication subsystem(s) 624 may include one or more wireless communication subsystems. Wireless communication subsystems 624 may include radio frequency receivers and transmitters and/or optical (e.g., infrared) receivers and transmitters. Wired communication systems may include a port device, e.g., a Universal Serial Bus (USB) port or some other wired port connection that may be used to establish a wired connection to other computing devices, such as other communication devices, network access devices, a personal computer, a printer, a display screen, or other processing devices capable of receiving or transmitting data.

The specific design and embodiment of the communication subsystem 624 may depend on the communication network(s) or medium(s) over which the device is intended to operate. For example, a device may include wireless communication subsystems designed to operate over a global system for mobile communications (GSM) network, a GPRS network, an enhanced data GSM environment (EDGE) network, IEEE802.xx communication networks (e.g., Wi-Fi, Wi-Max, ZigBee™), 3G, 4G, 4G LTE, code division multiple access (CDMA) networks, near field communication (NFC), Wi-Fi Direct and a Bluetooth™ network. Wireless communication subsystems 624 may include hosting protocols such that the device may be configured as a base station for other wireless devices. As another example, the communication subsystems may allow the device to synchronize with a host device using one or more protocols or communication technologies, such as, for example, TCP/IP protocol, HTTP protocol, UDP protocol, ICMP protocol, POP protocol, FTP protocol, IMAP protocol, DCOM protocol, DDE protocol, SOAP protocol, HTTP Live Streaming, MPEG Dash and any other known communication protocol or technology.

Audio subsystem 626 may be coupled to a speaker 628 and one or more microphones 630 to facilitate voice-enabled functions, such as voice recognition, voice replication, digital recording, and telephony functions. In an embodiment, audio subsystem includes a digital signal processor (DSP) that performs audio processing, such as implementing codecs. In an embodiment, the audio DSP implements at least some portions of control system 700 described in reference to FIG. 7.

I/O subsystem 640 may include touch controller 642 and/or other input controller(s) 644. Touch controller 642 may be coupled to a touch surface 646. Touch surface 646 and touch controller 642 may, for example, detect contact and movement or break thereof using any of a number of touch sensitivity technologies, including but not limited to, capacitive, resistive, infrared, and surface acoustic wave technologies, as well as other proximity sensor arrays or other elements for determining one or more points of contact with touch surface 646. In one embodiment, touch surface 646 may display virtual or soft buttons and a virtual keyboard, which may be used as an input/output device by the user.

Other input controller(s) 644 may be coupled to other input/control devices 648, such as one or more buttons, rocker switches, thumb-wheel, infrared port, USB port, and/or a pointer device such as a stylus. The one or more buttons (not shown) may include an up/down button for volume control of speaker 628 and/or microphone 630.

In some embodiments, device 600 may present recorded audio and/or video files, such as MP3, AAC, and MPEG video files. In some embodiments, device 600 may include the functionality of an MP3 player and may include a pin connector for tethering to other devices. Other input/output and control devices may be used.

Memory interface 602 may be coupled to memory 650. Memory 650 may include high-speed random access memory or non-volatile memory, such as one or more magnetic disk storage devices, one or more optical storage devices, or flash memory (e.g., NAND, NOR). Memory 650 may store operating system 652, such as Darwin, RTXC, LINUX, UNIX, OS X, iOS, WINDOWS, or an embedded operating system such as VxWorks. Operating system 652 may include instructions for handling basic system services and for performing hardware dependent tasks. In some embodiments, operating system 652 may include a kernel (e.g., UNIX kernel).

Memory 650 may also store communication instructions 654 to facilitate communicating with one or more additional devices, one or more computers or servers, including peer-to-peer communications. Communication instructions 654 may also be used to select an operational mode or communication medium for use by the device, based on a geographic location (obtained by the GPS/Navigation instructions 668) of the device.

Memory 650 may include graphical user interface instructions 656 to facilitate graphic user interface processing, including a touch model for interpreting touch inputs and gestures; sensor processing instructions 658 to facilitate sensor-related processing and functions; phone instructions 660 to facilitate phone-related processes and functions; electronic messaging instructions 662 to facilitate electronic-messaging related processes and functions; web browsing instructions 664 to facilitate web browsing-related processes and functions; media processing instructions 666 to facilitate media processing-related processes and functions; GNSS/Navigation instructions 668 to facilitate GNSS (e.g., GPS, GLOSSNAS) and navigation-related processes and functions; camera instructions 670 to facilitate camera-related processes and functions; and haptic engine instructions 672 for commanding or controlling haptic engine 617 and to provide the features and performing the processes described in reference to FIGS. 1-5.

Each of the above identified instructions and applications may correspond to a set of instructions for performing one or more functions described above. These instructions need not be implemented as separate software programs, procedures, or modules. Memory 650 may include additional instructions or fewer instructions. Furthermore, various functions of the device may be implemented in hardware and/or in software, including in one or more signal processing and/or application specific integrated circuits (ASICs).

Software instructions may be in any suitable programming language, including but not limited to: Objective-C, SWIFT, C# and Java, etc.

While this document contains many specific implementation details, these should not be construed as limitations on the scope what may be claimed, but rather as descriptions of features that may be specific to particular embodiments. Certain features that are described in this specification in the context of separate embodiments can also be implemented in combination in a single embodiment. Conversely, various features that are described in the context of a single embodiment can also be implemented in multiple embodiments separately or in any suitable sub combination. Moreover, although features may be described above as acting in certain combinations and even initially claimed as such, one or more features from a claimed combination can, in some cases, be excised from the combination, and the claimed combination may be directed to a sub combination or variation of a sub combination. Logic flows depicted in the figures do not require the particular order shown, or sequential order, to achieve desirable results. In addition, other steps may be provided, or steps may be eliminated, from the described flows, and other components may be added to, or removed from, the described systems. Accordingly, other implementations are within the scope of the following claims.

APPENDIX A—EXAMPLE OBSERVER FORMULATION

The state equation for the Linear Resonance Actuator (LRA) is defined by:

$$\begin{cases} \frac{d}{dt}\begin{bmatrix} x \\ \dot{x} \\ I \end{bmatrix} = \begin{bmatrix} 0 & 1 & 0 \\ \frac{-k_M}{m} & \frac{-c_M}{m} & \frac{k_{motor}}{m} \\ 0 & \frac{-k_{motor}}{L} & \frac{-\hat{R}}{L} \end{bmatrix} \begin{bmatrix} x \\ \dot{x} \\ I \end{bmatrix} + \begin{bmatrix} 0 \\ 0 \\ \frac{1}{L} \end{bmatrix} V \\ \begin{bmatrix} I \\ V \end{bmatrix} = \begin{bmatrix} 0 & 0 & 1 \\ 0 & 0 & 0 \end{bmatrix} \begin{bmatrix} x \\ \dot{x} \\ I \end{bmatrix} + \begin{bmatrix} 0 \\ 1 \end{bmatrix} V \end{cases}$$

$$\begin{cases} \dot{X} = A_c X + B_c u \\ Y = C_c X + D_c u \end{cases}$$

Where:

$$\begin{cases} k_M, & \text{Spring constant} \\ c_M, & \text{Mechanical Damping} \\ k_{motor}, & \text{Motor Constant} \\ L, & \text{Inductance of Coil} \\ \hat{R}, & \text{Estimated Resistance from Temperature Sensor} \\ m, & \text{Mass} \end{cases}$$

Now state space in discrete domain:

$$\begin{cases} x[n+1] = A_d x[n] + B_d u[n] \\ y[n] = C_d x[n] + D_d u[n] \end{cases}$$

with the continuous to Discrete Transformation defined by:

$$A_d = e^{A_c T_s}, \ B_d = A_c^{-1}(A_d - 1)B_c, \ C_d = C_c, \ D_d = D_c$$

A Kalman filter (KF) is used to generate a fused estimate of two measurement signals:

$$\begin{cases} x[n], & \text{From hall } B_z \text{ measurement, } x[n] = F^{-1}(B_z) \\ i[n], & \text{Current Measurement} \end{cases}$$

We setup the KF as follows. These are the KF "time update" equations $$\hat{x}[n+1]^- = A_d \hat{x}[n] + B_d u[n]$$

$$P[n+1]^- = AP[n]A^T + Q$$

$$z[n+1] = Hx[n]$$

Where:

$$\begin{cases} (\hat{x}[n+1]^-)_{3\times 1}, & \text{State Estimate} \\ z[n]_{2\times 1}, & \text{Measurement (Position, Current)} \\ H_{2\times 3}, & \text{Output Transition matrix, } \begin{bmatrix} 1 & 0 & 0 \\ 0 & 0 & 1 \end{bmatrix} \\ Q_{3\times 3}, & \text{Process/Plant Noise Covarience, } 0_{3\times 3} \\ (P[n+1]^-)_{3\times 3}, & \text{Error covariance, } P[0] = I_{3\times 3} \end{cases}$$

Then we update the next state using:

$$K[n+1] = P[n+1]^- H^T (HP[n+1]^- H^T + R_o)^{-1}$$

$$\hat{x}[n+1] = \hat{x}[n+1]^- + K[n+1](z[n+1] - H\hat{x}[n+1]^-)$$

$$P[n+1] = (I - K[n+1]H)P[n+1]^-$$

Where $$\begin{cases} K[n+1]_{3\times 2}, & \text{Kalman Gain} \\ (R_\sigma)_{2\times 2}, & \text{Measurement Noise Covariance Matrix} \\ (\hat{x}[n+1])_{3\times 1}, & \text{State after measurement update} \end{cases}$$

A fused estimate is obtained from $\hat{x}[n+1]$ which should be the optimal state estimate from position and current.

The formulation described above depends on a resistance estimate $\hat{R}$ obtained from the Hall sensor. Noise in the resistance estimate can be captured by using a the plant/process noise covariance matrix $Q_{3\times 3}$ in the covariance update equation:

$$P[n+1]^- = AP[n]A^T + Q.$$

What is claimed is:

1. A system for providing closed-loop control of a linear resonant actuator, the system comprising:
    a linear resonant actuator including a frame, one or more coils mounted to the frame and operable to generate a magnetic field; a mass including magnetic portions positioned within the frame and configured to move within the frame along a movement axis; and a magnetic field sensor mounted to the frame, the magnetic field sensor configured to generate a magnetic field sensor signal in response to the magnetic field;
    drive electronics coupled to the linear resonant actuator and configured to drive current into the one or more coils in response to an actuator control signal;

a system processor coupled to the magnetic field sensor and the drive electronics, the system processor configured to:
   receive the magnetic field sensor signal from a channel coupling the magnetic field sensor and the system processor;
   receive measurements of actuator current and actuator voltage from the drive electronics;
   receive a temperature signal from the linear resonant actuator, the temperature signal indicating a temperature of the magnetic field sensor;
   calculate a first estimate of mass position using the magnetic field sensor signal, actuator current and a magnetic model;
   calculate an estimate of coil resistance based on the temperature signal, the actuator current, the actuator voltage and a thermal model; and
   calculate a second estimate of mass position and an estimate of mass velocity based on the first estimate of mass position, the actuator current, the actuator voltage and the estimated coil resistance;
   calculate the actuator control signal based on the second estimate of mass position and the estimate of mass velocity; and
   provide the actuator control signal to the drive electronics, the actuator control signal configured to cause the drive electronics to adjust the drive current into the one or more coils.

2. The system of claim 1, wherein the magnetic field sensor is a Hall sensor.

3. The system of claim 1, wherein the system processor is a digital signal processor (DSP).

4. The system of claim 1, wherein the magnetic field sensor signal is an analog signal received from an analog channel that directly couples the system processor and the linear resonant actuator.

5. The system of claim 1, wherein the drive electronics and system processor are embedded in a system-in-package (SiP).

6. The system of claim 1, wherein the actuator control signal is at least one of a pulse width modulation (PWM) signal, a pulse code modulation (PCM) signal or a pulse density modulation (PDM) signal generated by the system processor.

7. The system of claim 1, wherein the second estimate of mass position and an estimate of mass velocity are generated by a discrete time observer that includes the estimated coil resistance in a state equation, and wherein measurement inputs to the observer include the first estimate of mass position and actuator current.

8. The system of claim 1, wherein the received temperature signal is an analog signal that is converted into a digital temperature signal by an analog-to-digital converter (ADC) included in the drive electronics.

9. The system of claim 1, wherein the magnetic field sensor signal is an analog signal that is converted into a digital signal by an analog-to-digital converter (ADC) including the system processor.

10. The system of claim 1, wherein the linear resonant actuator includes a plurality of coils, where at least two coils are mounted to top and bottom portions of the frame.

11. The system of claim 1, wherein the one or more coils are mounted to the mass and the magnetic portions are mounted to the frame.

12. The system of claim 1, wherein the linear resonant actuator includes a second magnetic field sensor, which provides a second magnetic field sensor signal, and the two magnetic field signals are used together to control z-axis motion of the mass.

13. A method of controlling a linear resonant actuator, the method comprising:
   driving, by drive electronics, a mass into motion along a movement axis using one or more coils;
   obtaining, from a magnetic field sensor a magnetic field sensor signal that varies in response to a magnetic field that is generated by the one or more coils when the mass is driven into motion;
   receiving, from a channel coupling the magnetic field sensor to a system processor, an analog output signal;
   receiving measurements of actuator current and actuator voltage from the drive electronics;
   receiving a temperature signal indicating a temperature of the magnetic field sensor;
   calculating a first estimate of mass position using the magnetic field sensor signal, actuator current, and a magnetic model;
   calculating an estimate of coil resistance based on the temperature signal, the actuator current, the actuator voltage and a thermal model;
   calculating a second estimate of mass position and an estimate of mass velocity based on the first estimate of mass position, the actuator current, the actuator voltage and the estimated coil resistance;
   calculating an actuator control signal based on the second estimate of mass position and the estimate of mass velocity; and
   providing the actuator control signal to the drive electronics, the actuator control signal configured to cause the drive electronics to adjust the drive current provided to the one or more coils.

14. The method of claim 13, wherein calculating a second estimate of mass position and an estimate of mass velocity further comprises:
   calculating, by a discrete time observer, a second estimate of mass position and an estimate of mass velocity using the first mass position estimate, the estimated coil resistance and actuator current.

15. The method of claim 13, wherein calculating the actuator control signal further comprises:
   calculating, by a closed-loop controller, the actuator control signal based on the second estimate of mass position and the estimate of mass velocity.

16. A system comprising:
   a linear resonant actuator including a mass, one or more coils and a magnetic field sensor;
   drive electronics coupled to the linear resonant actuator and configured to drive the one or more coils in response to an actuator control signal;
   a system processor coupled to the drive electronics and the linear resonant actuator, the system processor configured to:
      drive, by the drive electronics, the mass into motion along a movement axis using the one or more coils;
      obtain, from the magnetic field sensor, a magnetic field sensor signal that varies in response to a magnetic field that is generated by the one or more coils when the mass is driven into motion;
      receive, from a channel coupling the magnetic field sensor to a system processor, the magnetic field sensor signal;
      receiving measurements of actuator current and actuator voltage from the drive electronics;
      receive a temperature signal indicating a temperature of the magnetic field sensor;

calculate a first estimate of mass position using the magnetic field sensor signal, actuator current and a magnetic model;
calculate an estimate of coil resistance based on the temperature signal, the actuator current, the actuator voltage and a thermal model;
calculate a second estimate of mass position and an estimate of mass velocity based on the first estimate of mass position, the actuator current, the actuator voltage and the estimated coil resistance;
calculate the actuator control signal based on the second estimate of mass position and the estimate of mass velocity; and
provide the actuator control signal to the drive electronics, the actuator control signal configured to cause the drive electronics to adjust the drive current provided to the one or more coils.

17. The system of claim 16, wherein the magnetic field sensor is a Hall sensor.

18. The system of claim 16, wherein the system processor is a digital signal processor (DSP).

19. The system of claim 16, wherein the magnetic field sensor signal is an analog signal received from an analog channel that directly couples the system processor and the linear resonant actuator.

20. The system of claim 16, wherein the second estimate of mass position and an estimate of mass velocity are generated by a discrete time observer that includes the estimated coil resistance in a state equation, and wherein measurement inputs to the observer include the first estimate of mass position and actuator current.

* * * * *